DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 30, 1971

892 O.G. 1604

T892,021

MONOAZO COMPOUNDS CONTAINING A THIOMORPHOLINEDIOXIDE GROUP AND MATERIALS DYED THEREWITH

Max A. Weaver and David J. Wallace, both of P.O. Box 511, Kingsport, Tenn. 37662

Continuation of application Ser. No. 721,094, Apr. 12, 1968. This application Mar. 5, 1970, Ser. No. 17,010

Int. Cl. C09b *29/36, 62/82;* D06p *1/04*

U.S. Cl. 8—41 C

No Drawing. 22 Pages Specification

Monoazo dyes of the formula

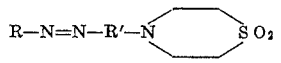

wherein R is a 2-thiazolyl, a 2-benzothiazolyl, a 1,3,4-thiadiazol-2-yl, a 1,2,4-thiadiazol-2-yl, a 3-pyrazolyl or a 2-thienyl radical and R′ is a p-phenylene radical which dyes are useful in dyeing hydrophobic textile materials to give yellow to blue dyeings having good light, washing, gas and sublimation fastness properties.